US008566086B2

(12) United States Patent
Giesbrecht et al.

(10) Patent No.: US 8,566,086 B2
(45) Date of Patent: Oct. 22, 2013

(54) SYSTEM FOR ADAPTIVE ENHANCEMENT OF SPEECH SIGNALS

(75) Inventors: David Giesbrecht, Toronto (CA); Phillip Hetherington, Port Moody (CA)

(73) Assignee: QNX Software Systems Limited, Kanata, Ontario ( * ) Notice: Subject to any disclaimer, the term of this patent is extended or adjusted under 35 U.S.C. 154(b) by 1998 days.

(21) Appl. No.: 11/167,955

(22) Filed: Jun. 28, 2005

(65) Prior Publication Data
US 2006/0293882 A1 Dec. 28, 2006

(51) Int. Cl.
*G10L 21/00* (2013.01)
*G10L 15/00* (2013.01)
*A61F 11/06* (2006.01)

(52) U.S. Cl.
USPC ........... 704/225; 704/224; 704/226; 704/233; 704/240; 381/71.11; 381/71.12

(58) Field of Classification Search
USPC .......................... 704/225, 226, 233, 240, 244
See application file for complete search history.

(56) References Cited

U.S. PATENT DOCUMENTS

| | | | | | |
|---|---|---|---|---|---|
| 4,454,609 | A | * | 6/1984 | Kates | 381/320 |
| 4,630,304 | A | * | 12/1986 | Borth et al. | 381/94.3 |
| 5,251,263 | A | * | 10/1993 | Andrea et al. | 381/71.6 |
| 5,485,522 | A | * | 1/1996 | Solve et al. | 381/56 |
| 5,655,057 | A | * | 8/1997 | Takagi | 704/233 |
| 5,742,694 | A | * | 4/1998 | Eatwell | 381/94.2 |
| 5,991,718 | A | * | 11/1999 | Malah | 704/233 |
| 6,032,115 | A | | 2/2000 | Kanazawa et al. | |
| 6,035,048 | A | * | 3/2000 | Diethorn | 381/94.3 |
| 6,275,798 | B1 | * | 8/2001 | Johansson et al. | 704/233 |
| 6,314,396 | B1 | | 11/2001 | Monkowski | |
| 6,377,918 | B1 | * | 4/2002 | Series | 704/226 |
| 6,411,927 | B1 | | 6/2002 | Morin et al. | |
| 7,209,567 | B1 | * | 4/2007 | Kozel et al. | 381/94.3 |

(Continued)

FOREIGN PATENT DOCUMENTS

WO WO 98/43238 10/1998

OTHER PUBLICATIONS

Stern et al, "Acoustical Pre-Processing for Robust Speech Recognition", Oct. 1989, Proc. Speech and Natural Language Workshop, pp. 311-318.*

(Continued)

*Primary Examiner* — Richemond Dorvil
*Assistant Examiner* — Olujimi Adesanya
(74) *Attorney, Agent, or Firm* — Brinks Hofer Gilson & Lione

(57) ABSTRACT

A method and system for enhancing the frequency response of speech signals are provided. An average speech spectral shape estimate is calculated over time based on the input speech signal. The average speech spectral shape estimate may be calculated in the frequency domain using a first order IIR filtering or "leaky integrators." Thus, the average speech spectral shape estimate adapts over time to changes in the acoustic characteristics of the voice path or any changes in the electrical audio path that may affect the frequency response of the system. A spectral correction factor may be determined by comparing the average speech spectral shape estimate to a desired target spectral shape. The spectral correction factor may be added (in units of dB) to the spectrum of the input speech signal in order to enhance or adjust the spectrum of the input speech signal toward the desired spectral shape, and an enhanced speech signal re-synthesized from the corrected spectrum.

18 Claims, 12 Drawing Sheets

(56) References Cited

U.S. PATENT DOCUMENTS

| | | | |
|---|---|---|---|
| 7,383,179 B2* | 6/2008 | Alves et al. | 704/228 |
| 7,454,010 B1* | 11/2008 | Ebenezer | 379/392.01 |
| 2005/0075866 A1* | 4/2005 | Widrow | 704/211 |
| 2006/0089958 A1* | 4/2006 | Giesbrecht et al. | 708/300 |
| 2008/0107280 A1* | 5/2008 | Haulick et al. | 381/66 |

OTHER PUBLICATIONS

Picone, "Signal Modeling Techniques in Speech Recognition", 1993, Proc. of the IEEE, vol. 81. No. 9, pp. 1215-1247.*

Jensen et al, "Speech Enhancement Using a Constrained Iterative Sinusoidal Model", 2001, IEEE transactions on Speech and Audio Processing, vol. 9, No. 7, pp. 731-740.*

Diethorn, "Subband Noise Reduction Methods for Speech Enhancement", In "Audio Signal Processing: For Next Generation Multimedia Communication Systems", Chapter 4, Feb. 2004, pp. 91-115.*

Cohen, "On speech enhancement under signal presence uncertainty," 2001, Acoustics, Speech, and Signal Processing, 2001. Proceedings. (ICASSP '01). 2001 IEEE International Conference on, vol. 1, No., pp. 661-664 vol. 1, 2001.*

Martin et al, "Optimal Recursive Smoothing of Non-Stationary Periodograms", 2001, In Proc. Int. Workshop Acoust. Echo and Noise Control (IWAENC), pp. 167-170, 2001.*

Tilp: Single-channel Noise Reduction with Pitchadaptive Post-filtering, 2000, In Proc. EUSIPCO-2000, vol. 1, 171-174, Tampere, Finland, 2000.*

Lee et al, "An improved voice activity detection algorithm employing speech enhancement preprocessing,", 2001, IEICE Trans. Fundamentals, vol. E84-A, No. 6, pp. 1401-1405, Jun. 2001.*

Acero A et al: "Acoustial Pre-Processing for Robust Spoken Language System" Proceedings of the International Conference spoken language processing (ICSLP). Kobe, Nov. 18-22, 1990 Tokyo, ASJ, JP, vol. 2, pp. 1121-1124.

Acero A et al: "Robust Speech Recogition by Normalization of the Acoustic Space" Speech Processing 2, VLSI, Underwater Signal Processing. Toronto, May 14-17, 1991, International Conference on Acoustic, Speech & Signal Processing. ICASSP, pp. 893-896.

Chinese Office Action (and Translation) for Chinese Application No. 200610093086.2, both created after the filing of the present application, Jun. 2, 2010. (7 pages total).

European Examination Report dated May 18, 2011 for corresponding European Patent Application No. 06 012 166.2, 4 pages.

* cited by examiner

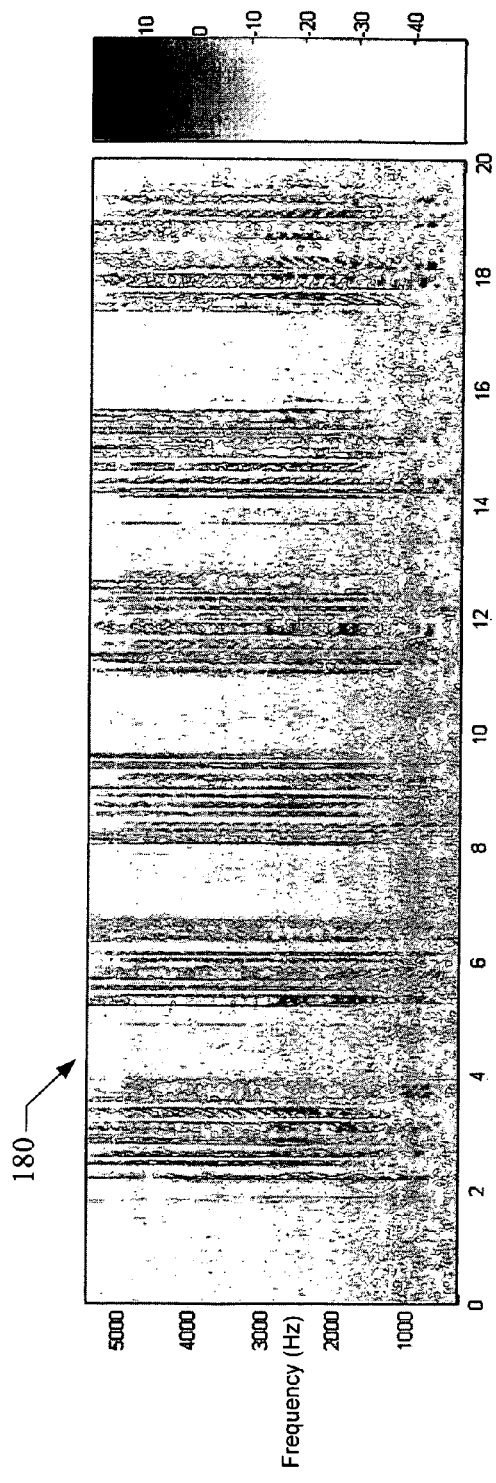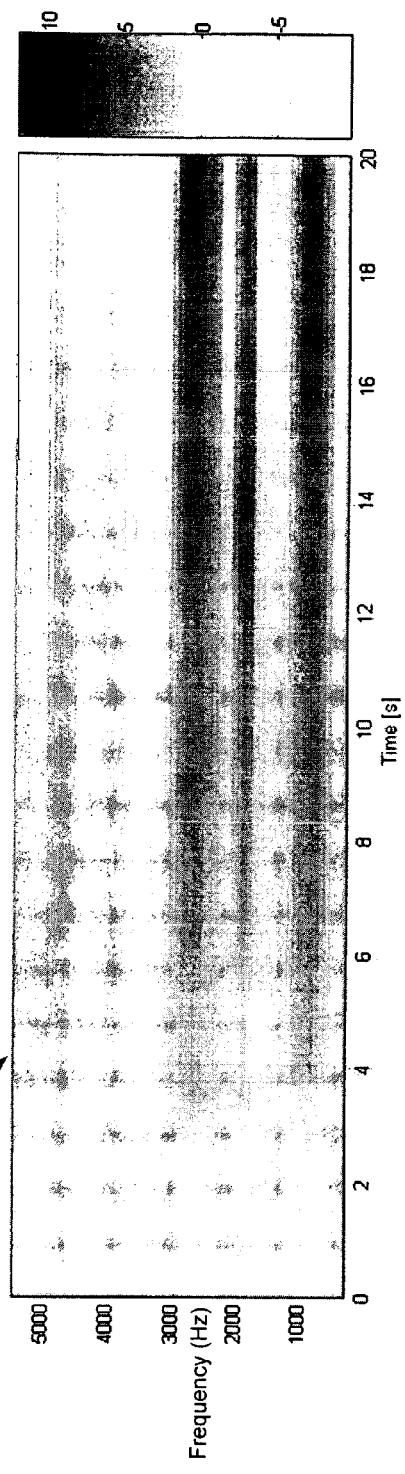
Fig. 10
Fig. 11

SYSTEM FOR ADAPTIVE ENHANCEMENT OF SPEECH SIGNALS

BACKGROUND OF THE INVENTION

The present invention relates to a system and method for adaptively enhancing the frequency response of a speech signal in real-time. A speech signal received at a microphone and input to an audio application may be adversely impacted by slowly varying, or time-invariant acoustical or electrical characteristics of the acoustical environment or the electrical audio path. For example, for a hands-free telephone system in an automobile, the in-car acoustics or microphone characteristics can have a significant detrimental impact on the sound quality or intelligibility of a speech signal transmitted to a remote party.

Adjusting the spectral shape of a received speech signal can significantly improve the quality of the speech signal. For example, the spectral shape of a speech signal may be adjusted to compensate for excessive background noise. By boosting the signal in frequency ranges where speech content is prevalent while attenuating the signal in frequency ranges where background noise predominates, the overall sound quality or intelligibility of the signal can be significantly improved. In other applications it may be desirable to boost different frequency ranges and attenuate others. For example, the ideal spectral shape for a handsfree telephone system may be significantly different from the ideal spectral shape for a speech recognition system. In the first case, it is desirable to improve both sound quality and intelligibility, in the second it may be more desirable to improve the intelligibility of the speech signal with little or no regard to the actual sound quality.

FIG. 1 shows two examples of desirable frequency responses for two different applications. The first frequency response curve 10 represents a spectral shape intended to provide optimal speech quality in an environment with a high a signal-to-noise ratio (SNR). The second frequency response curve 12 shows a spectral shape intended to provide optimal speech intelligibility in a low signal-to-noise environment. FIG. 1 also shows VDA (Verband der Automobilindustrie) and ITU (International Telecommunications Union) upper and lower spectral limits 14, 16 for the frequency response in hands-free telephony systems. In some cases it may also be desirable to adjust the spectral shape of a received speech signal to conform with the VDA and ITU limits for speech frequency response.

Typically, a speech signal recorded by a microphone and input to an audio application will have an actual spectral shape significantly different from the ideal spectral shape for the application. Accordingly, adjusting the spectrum of the speech signal to more closely conform to the ideal spectral shape is desirable. A system and method for performing such an adjustment, or normalization, must be capable of taking into account the acoustic transfer function characteristics of the environment in which the speech signal is recorded, and the frequency response of the electrical audio path. Furthermore, such a system and method must also take into account acoustic and electrical changes that may occur in the systems.

SUMMARY OF THE INVENTION

A system and method for adaptively enhancing speech signals are provided. The system and method of the invention affectively normalize the spectrum of an input speech signal toward a target spectral shape, or ideal frequency response. The target spectral shape may be selected based on the application for which the speech signal is intended. For example, a desired spectral shape for a speech signal destined to be transmitted via a handsfree telephone in an automobile may be significantly different from the desired spectral shape of a speech signal which is to be input into a speech recognition system.

According to the invention, an average speech spectral shape estimate is calculated based on speech signals received over time. The average speech spectral shape estimate may be calculated using first order IIR filtering or "leaky integrators." Thus, over time the average speech spectral shape estimate adapts to changes in the acoustic characteristics of the voice path or any changes in the electrical audio path that may affect the frequency response of the system.

The spectral correction factor may be determined by comparing the average speech spectral shape estimate to the desired or target spectral shape. The spectral correction factor represents on average, the differences in the time-averaged spectral energy of received speech signals and the desired frequency response. The spectral correction factor may be added to the spectrum of the input speech signal in order to normalize, or adjust, the spectrum of the input speech signal toward the desired spectral shape.

Accordingly, an embodiment of a method of normalizing a speech signal will include determining the average spectral shape of the input speech. The method further includes comparing the average spectral shape of the input speech to the target spectral shape. Differences between the target spectral shape and the average spectral shape of speech that has been received over time may be used to correct the spectrum of the input speech signal. The corrected spectrum of the speech signal will more closely match the desired spectral shape for the particular application for which the speech signal is intended.

According to another embodiment, the frequency response of the speech signal is enhanced in real-time. A frequency sub-band analysis is performed on successive overlapping windowed buffers of the input speech signal. The results of the frequency sub-band analysis of each successive windowed buffer are used to calculate an average speech spectral shape estimate. The average speech spectral shape estimate is then subtracted from the desired target spectral shape. The difference between the target spectral shape and the average speech spectral shape estimate form a spectral shape correction factor. The spectral shape correction factor may then be added to the spectrum corresponding to the windowed buffer of the input speech signal. Corrected spectra from successive windowed buffers may then be re-synthesized into an enhanced or normalized voice signal.

Another embodiment enhances the frequency response of a speech signal by adjusting the spectral shape of the background noise of a received speech signal. This embodiment includes performing a frequency sub-band analysis on successive overlapping windowed buffers of a speech signal. A background noise estimate is generated based on the received signal. Next, a background noise spectral shape correction factor is calculated by subtracting the background noise estimate from a target background noise spectral shape. The background noise spectral shape correction factor is then added to a spectrum corresponding to one of the successive overlapping windowed buffers.

Yet another embodiment enhances the quality and intelligibility of a received speech signal by adjusting one or both of the average speech spectral shape of a received speech signal and the background noise spectral shape of the received signal. According to this embodiment a method of enhancing a frequency response of a speech signal also includes performing a frequency sub-band analysis on successive overlapping windowed buffers of a speech signal. An average speech spectral shape estimate is calculated based on the frequency sub-band analysis of successive overlapping windowed buffers. A speech spectral shape correction factor is calculated according to the difference between the average speech spectral shape estimate and a target speech spectral shape. Also, the background noise included in the received signal is estimated and a background noise spectral shape correction factor is calculated corresponding to differences between the background noise estimate and a target background noise spectral shape. The speech spectral shape correction factor and the background noise spectral shape correction factor are combined to form an overall spectral shape correction factor. The overall spectral shape correction factor is then applied to a spectrum corresponding to one of the successive overlapping windowed buffers of the received speech signal.

Finally, a system for enhancing the frequency response of a speech signal includes a microphone for receiving the speech signal. An A/D converter converts the speech signal into a digital audio signal which is input to a processor. The processor is adapted to determine an average speech spectral shape estimate of the speech recorded by the microphone. The processor compares the average speech spectral shape estimate to a target spectral shape. The processor then adjusts the spectral shape of the input speech signal based on differences between the average speech spectral shape estimate and the target spectral shape. The processor outputs a normalized speech signal having an enhanced frequency response which is closer to the ideal frequency response for the particular application for which the speech signal is intended.

The processor may also be adapted to determine a background noise spectral shape estimate of a received signal. The processor may then compare the background noise spectral shape estimate with a target background noise spectral shape. The processor may then adjust the spectral shape of the input speech signal based on differences between the background noise spectral shape estimate and the target background noise spectral shape. The processor may then output a normalized speech signal having an enhanced frequency response that has a background noise spectral shape which is closer to the desired background noise spectral shape Other aspects, features and advantages of the invention will be, or will become, apparent to those skilled in the art upon examination of the following figures and detailed description. It is intended that all such additional aspects, features and advantages included within this description be included within the scope of the invention, and protected by the appended claims.

BRIEF DESCRIPTION OF THE DRAWINGS

FIG. 10 is a spectrogram—time v. frequency v. dB (in shades of grey)—of an input speech signal.

FIG. 11 is a spectrogram showing the adaptation of the average speech spectral shape estimate over time.

DESCRIPTION OF THE PREFERRED EMBODIMENTS

A system and methods for adaptively enhancing the frequency response of a speech signal in real-time are provided. The system and methods compensate for the spectral effects of any slowly varying or time-invariant acoustical or electrical characteristics of the audio and electrical paths, including for example, room acoustics, microphone frequency response, and other factors such as background noise, and the like. The system and methods include provisions for receiving an input speech signal, calculating an average speech spectral shape estimate and a background noise estimate, calculating a correction factor for adjusting the average speech spectral shape estimate to conform to a target speech spectral shape, or adjusting the spectral shape of the background noise, and applying the correction factor to spectra of successive windowed buffers of the input speech signal in order to arrive at a desired target frequency response specifically adapted for a particular application. The corrected spectra corresponding to successive windowed buffers may be re-synthesized into an enhanced speech signal more suitable to the application for which the speech signal is intended.

Figure 1:
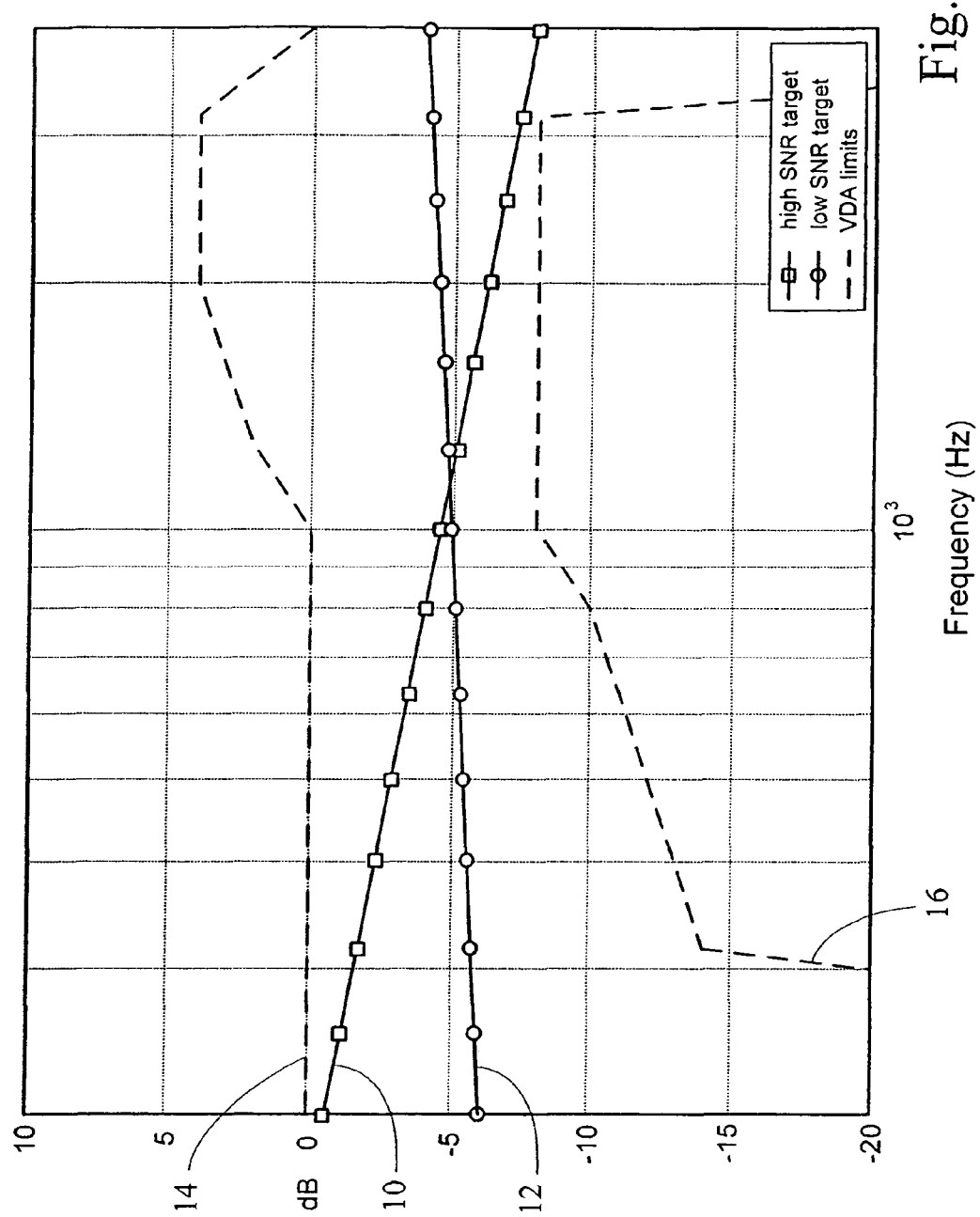
FIG. 1 is a dB v. frequency plot showing two examples of ideal frequency responses, or target speech spectral shapes, for two different applications.
Figure 2:
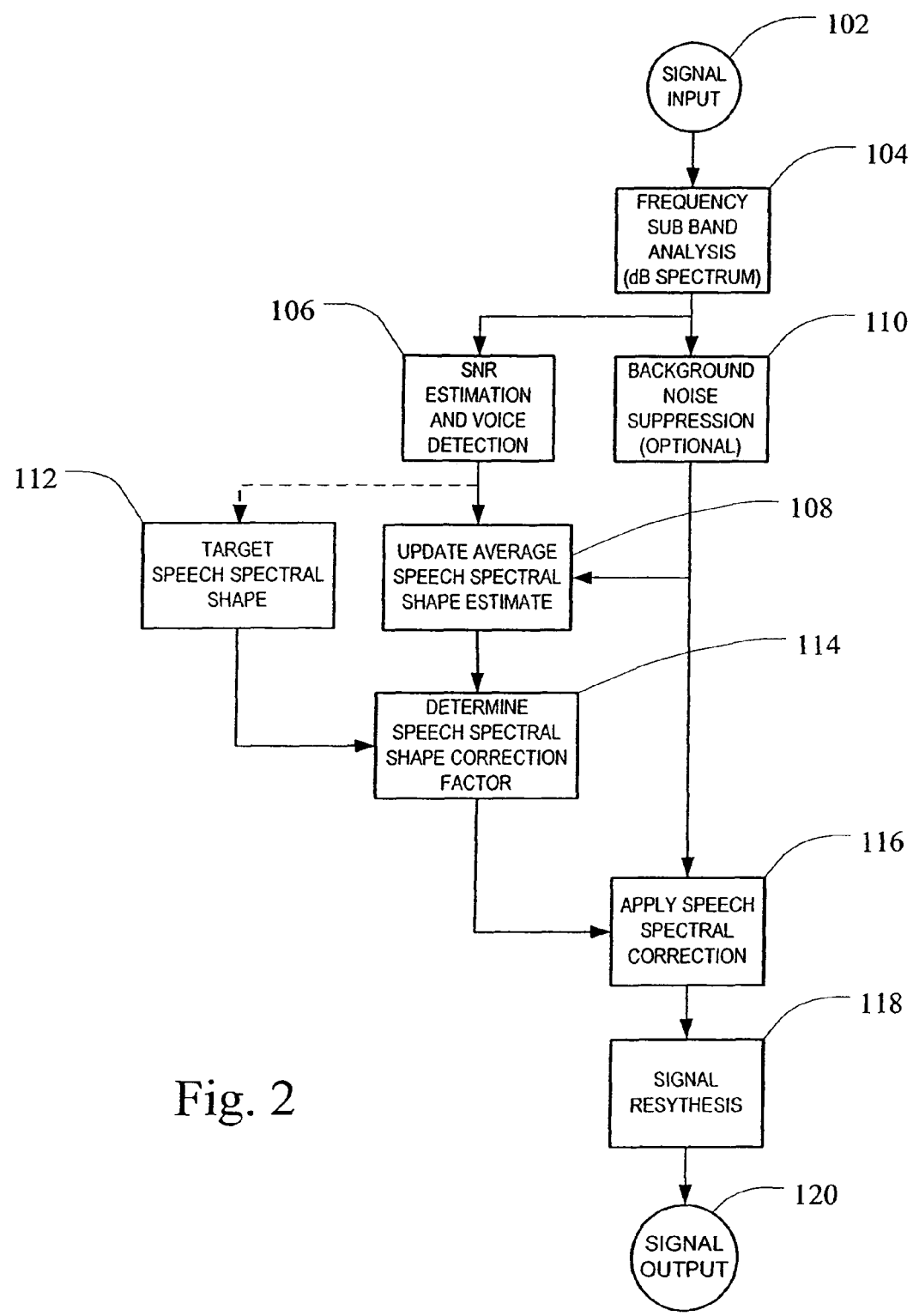
FIG. 2 is a flow chart illustrating a method of enhancing the frequency response of a speech signal.

FIG. 2 shows a flow chart 100 of a method for adaptively enhancing the frequency response of a speech signal according to the invention. An input speech signal is received at 102. The signal may or may not include speech content. A frequency sub-band analysis is performed on the input signal at 104. The frequency sub-band analysis results in a compressed dB spectrum of the input signal. The compressed dB spectrum is used to create an average speech spectral shape estimate, which in turn is used to calculate a speech spectral shape correction factor which may be added back to the spectrum of the input signal to create an enhanced speech signal having approximately the desired spectral shape.

To this end, the compressed dB spectrum generated by the sub-band analysis 104 is applied to SNR estimation and voice detection 106. The SNR estimation and voice detection 106 attempt to identify which frequency bins of the compressed dB spectrum of the input signal contain speech content. The dB values of the frequency bands which are found to have a high SNR and contain speech content are used to update an average speech spectral shape estimate at 108. The average speech spectral shape estimate is the running average of the spectral shape of speech received over time. Because the average speech spectral shape is a running average, it adapts slowly and provides a reasonably accurate estimate of the spectral shape of the speech content of the received input signal. The average speech spectral shape, accounts for the slowly varying or time invariant frequency response characteristics of the system, including the acoustical transfer function characteristics of the environment, the electro-acoustic characteristics of the microphone, and the like.

The average speech spectral shape estimate is compared to a target speech spectral shape provided at 112. The target speech spectral shape may represent the ideal frequency response for a particular application, such as a handsfree telephone system or a voice recognition system. Differences between the average speech spectral shape estimate and the target speech spectral shape represent the amount by which the average spectrum of the input speech signal must be adjusted in order to achieve the desired spectral shape. At 114 a speech spectral shape correction factor is determined by subtracting the average speech spectral shape from the target speech spectral shape. The speech spectral shape correction factor may then be added back to the compressed dB spectrum of the original signal received at 102. Background noise suppression 110 may optionally be applied to the compressed dB spectrum prior to adding the correction factor, if desired. Otherwise, the speech spectral shape correction factor is applied directly to the compressed dB spectrum at 116. A corrected or enhanced signal is re-synthesized at 118 and output at 120.

Figure 3:
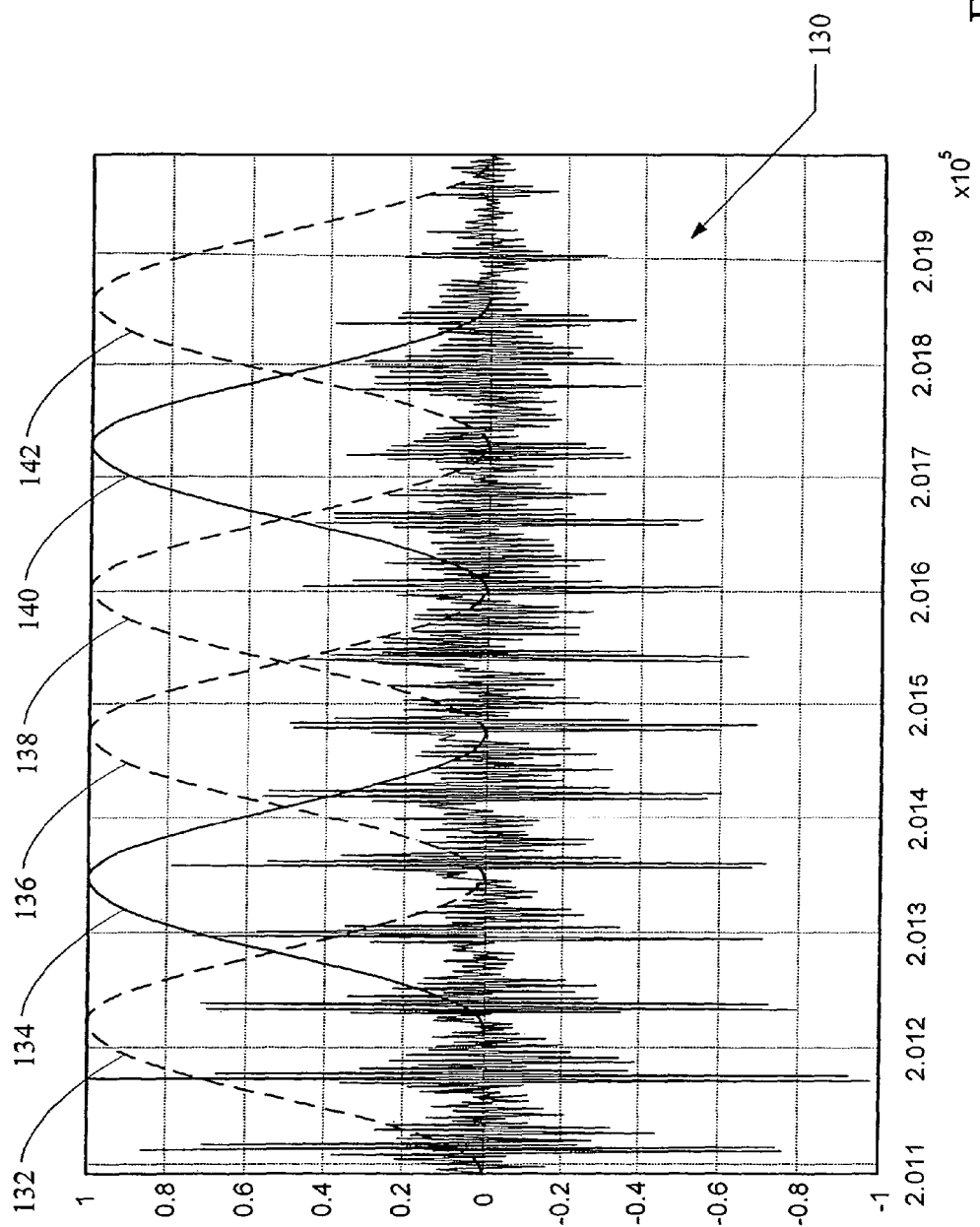
FIG. 3 shows a time domain speech signal and a plurality of overlapping windowed buffers.

FIG. 3 shows an 11 kHz time-domain speech signal 130 that is to be enhanced according to the method outlined in FIG. 2. A frequency sub-band analysis is performed on successive overlapping windowed buffers. The windowed buffers may be calculated using 256-point Hanning windows with 50% overlap. Other windowing functions, window lengths, or overlap percentage values may also be used. FIG. 3 shows 50% overlapped Hanning windows 132, 134, 136, 138, 140, and 142. The frequency sub-band analysis is performed on each successive windowed buffer. The results of the frequency sub-band analysis from each windowed buffer contributes to the average speech spectral shape estimate. For purposes of the present description, the analysis of a single windowed buffer 134 will be described, with the understanding that the analysis of all other windowed buffers proceeds in a like manner.

Figure 4:
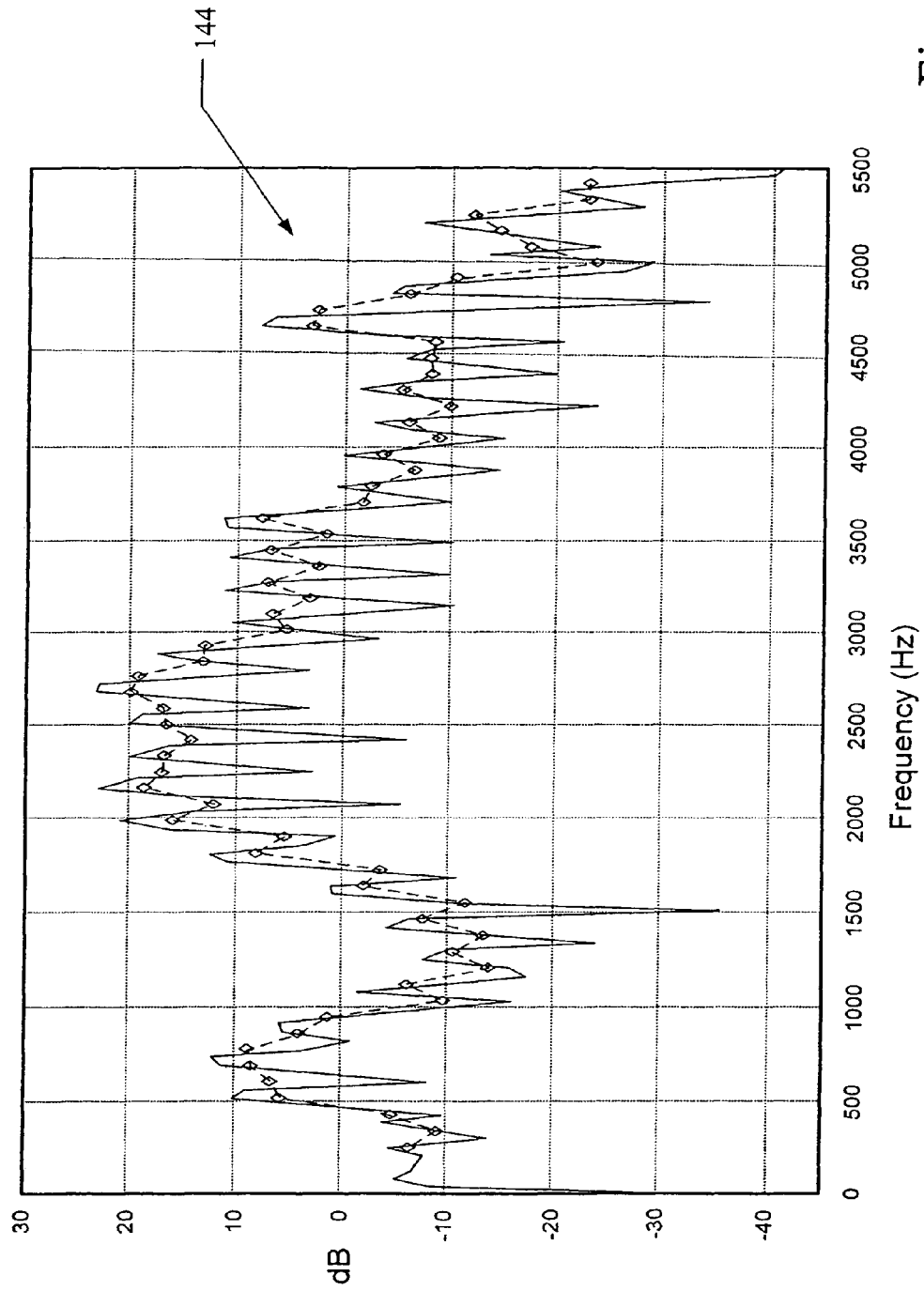
FIG. 4 is a dB v. frequency plot of the spectrum of the speech signal of FIG. 3 corresponding to one of the windowed buffers.

A frequency spectrum is obtained for the portion of the signal 130 within the windowed buffer 134. Frequency spectral information may be obtained by various methods such as fast Fourier transform (FFT), wavelet filter banks, polyphase filter banks, and other known algorithms. For example, a complex spectrum may be obtained using a 256-point FFT. The complex spectrum may be converted to a power spectrum by squaring the absolute value of the complex spectrum:

$$\text{Power\_Spec}(f) = |\text{Complex\_Spec}(f)|^2 \quad (1)$$

where
Power_Spec is the power spectrum
Complex_Spec is the complex spectrum
f is the frequency bin index The power spectrum in turn may be converted to dB. FIG. 4 shows a dB spectrum 144 of the portion of the input signal contained within windowed buffer 134. The dB spectrum 144 is the result of a 256 point FFT.

The dB spectrum 144 includes a number of sharp peaks and valleys due to the harmonic content of a voiced speech segment (e.g. a vowel sound). The general shape of the spectral envelope may be analyzed by compressing the dB spectrum 144 into a spectrum having coarser frequency resolution. Frequency compression may be accomplished by calculating a weighted average across given frequency regions. The compressed spectrum may have a linear frequency scale, or the compressed spectrum may have a non-linear frequency scale such as a Bark, Mel, or other non-linear scale depending and the compression technique applied. The frequency sub-bands of the compressed spectrum may exhibit, for example, a frequency resolution of 86 to 172 Hz per compressed sub-band. For an 11 kHz input signal and a 256-point FFT, this corresponds to calculating the average power of the non-compressed spectrum across every two to four uncompressed frequency bins, respectively.

Figure 5:
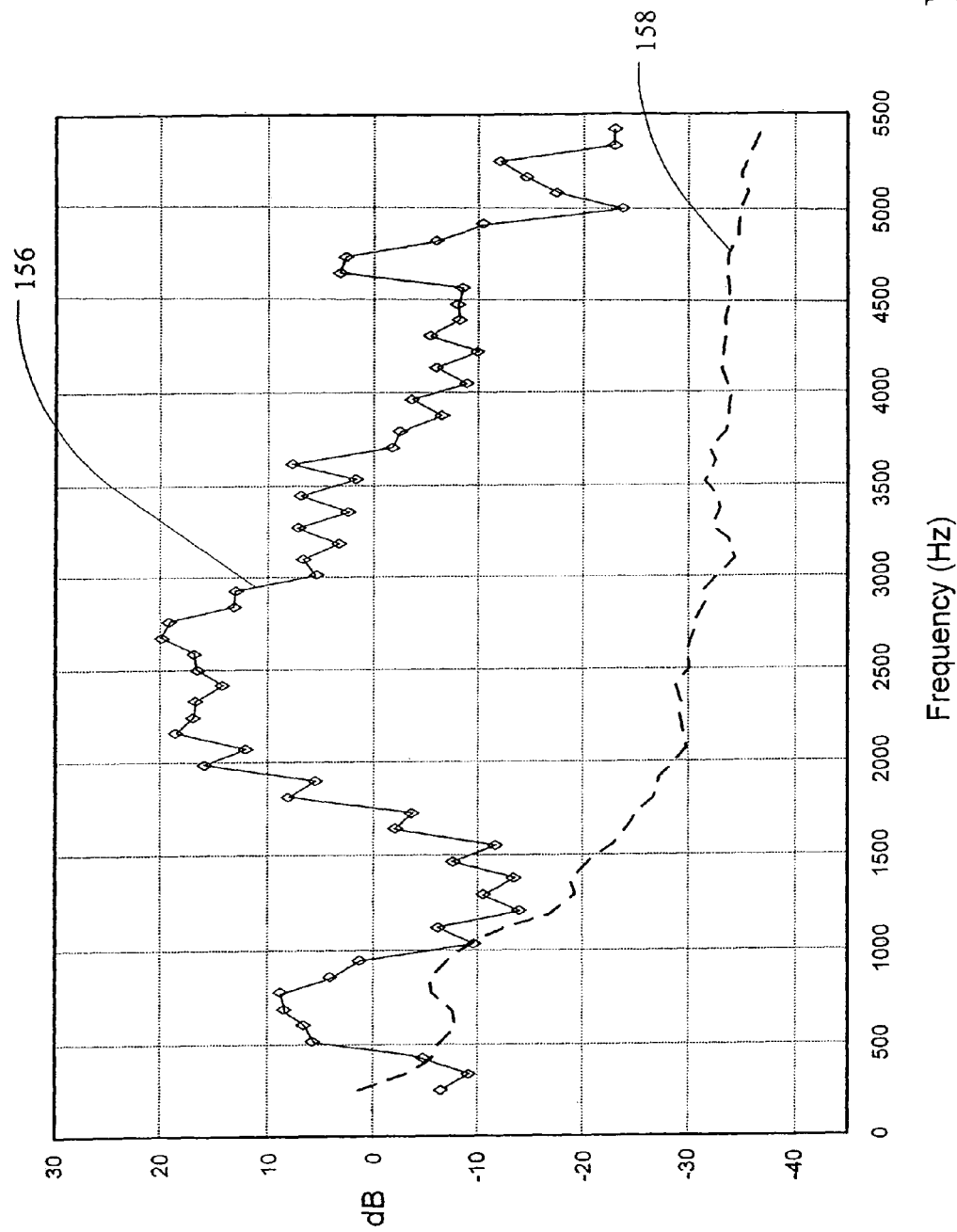
FIG. 5 is a dB v. frequency plot of a frequency-compressed version of the spectrum shown in FIG. 4, along with a background noise estimate.

A compressed spectrum 156 based on the uncompressed spectrum 144 of FIG. 4 is shown in FIG. 5. As can be seen, the compressed spectrum 156 maintains the general shape of the uncompressed spectrum 144. The compressed spectrum 156 represents the output of the frequency sub-band analysis 104. A separate compressed spectrum is generated for each successive overlapping windowed buffer. Each contributes to the calculation of the speech spectral shape estimate. The average speech spectral shape estimate, as updated by the frequency sub-band analysis of each successive windowed buffer, is used to calculate the speech spectral shape correction factor for the spectrum of the corresponding windowed buffer. The correction factor is added back to the compressed dB spectrum of the corresponding windowed buffer, to normalize the spectrum to the desired target spectral shape.

The compressed dB spectrum generated during the frequency sub-band analysis is input to SNR estimation and voice detection 106. The purpose of SNR estimation and voice detection 106 is to determine which frequency bands of the compressed dB signal have a strong signal-to-noise ratio (SNR) and are likely to contain speech. Only those frequency sub-bands of the compressed dB signal having both a high SNR and which are likely to contain speech are used to update the average speech spectral shape estimate. Those frequency bands having weak SNR or which likely do not contain speech do not contribute to the calculation of the average speech spectral shape estimate.

Figure 6:
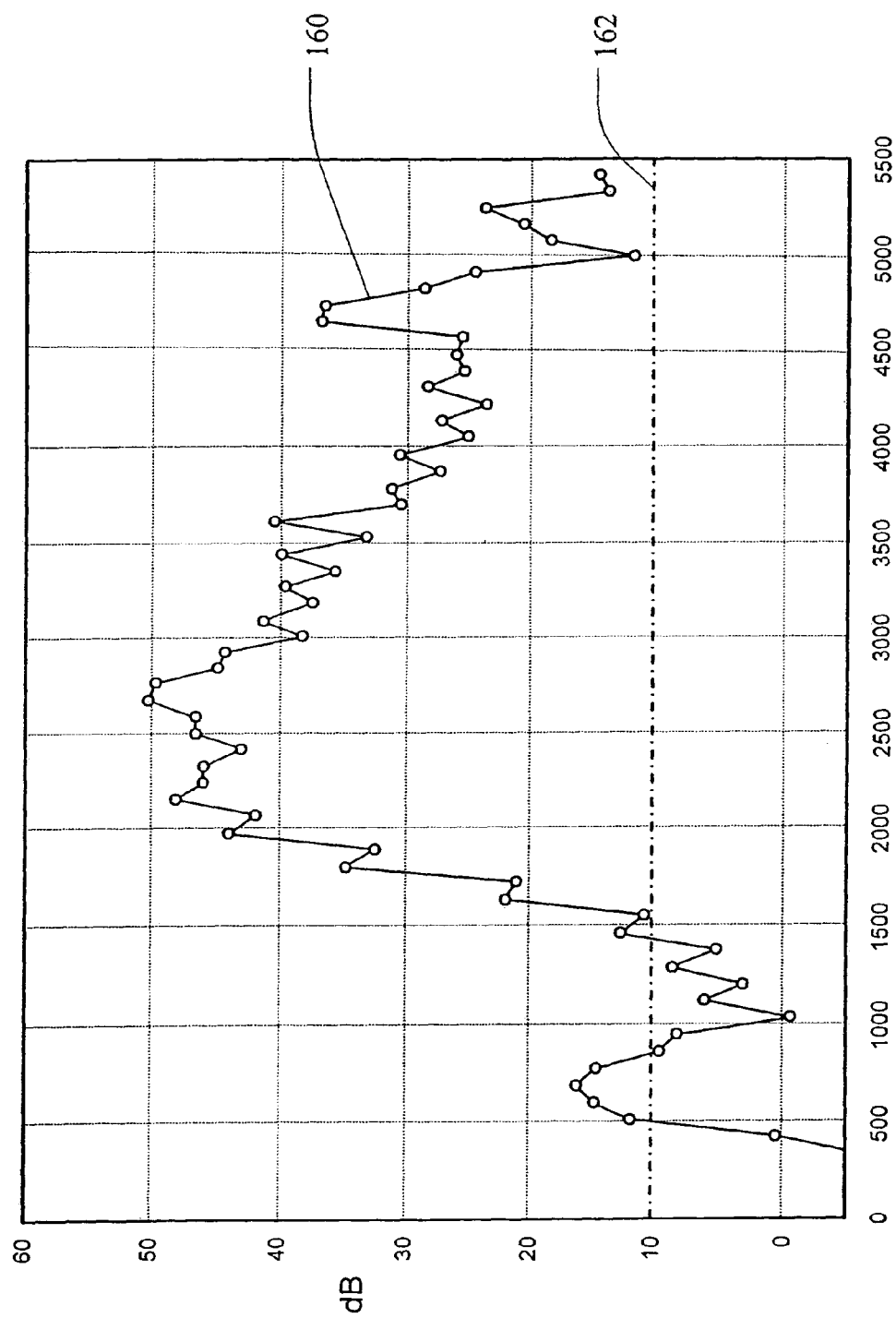
FIG. 6 is a dB v. frequency plot of the compressed spectrum of FIG. 5 with the background noise subtracted (i.e. SNR) and a threshold value representing a signal level 10 dB above the background noise.

SNR estimation may be performed according to any number of standard methods. FIG. 5, for example, includes a background noise estimate 158 derived using a minimum statistics technique. An estimate of the SNR at each frequency sub-band may be obtained by subtracting the background noise estimate 158 from the compressed dB spectrum 156. FIG. 6 shows the SNR 160 that results from subtracting the noise estimate 158 from the compressed dB spectrum 156 of FIG. 5.

It must be noted that the noise estimate 158 is not the true background noise. It is just an estimate of the noise likely to be contained in the compressed dB spectrum 156. The actual noise in any given frequency sub-band may be greater or less than the levels shown in the background noise estimate 158. Thus, signal levels that are near the noise estimate are less reliable. Accordingly, a threshold value may be established such that only frequency sub-bands having a signal level above the noise estimate by an amount at least equal to the threshold value contribute to the average speech spectral shape estimate. Such a threshold is illustrated in FIG. 6. The 10 dB threshold 162 represents a signal level 10 dB above the background noise estimate 158. Since the compressed dB spectrum 160 represents the portion of the input signal spectrum that lies above the background noise estimate 158, the portions of the compressed dB spectrum 160 that are above the 10 dB threshold 162 represent those portions of the original compressed dB spectrum 156 that are more than 10 dB above the background noise estimate 158. Only those frequency sub-bands in which the compressed dB spectrum 160 is above the 10 dB threshold will contribute to the average speech spectral shape estimate.

Threshold values other than 10 dB may be used. Preferably the threshold value will be in the range between 5 to 15 dB. Additionally, the threshold need not be constant. The threshold value may vary from one frequency sub-band to the next, depending upon the expected noise characteristics of the system. For example, in automotive applications, the threshold could be set higher for lower frequency sub-bands where significant background noise energies reside.

An average speech spectral shape estimate is created for each frequency sub-band of the compressed spectrum. The compressed spectrum for each successive overlapping windowed buffer contributes to the computation of the average speech spectral shape estimate. However, as noted above, the average speech spectral shape estimate for each individual frequency sub-band is updated only when the individual frequency sub-band has a high SNR and contains speech. Before adapting the average speech spectral shape estimate, it may be advantageous to normalize the overall level of the current compressed dB spectrum according to:

$$\text{Spec\_Curr\_n}(f) = \text{Spec\_Curr}(f) - \frac{1}{N}\left(\sum_{f}^{N} \text{Spec\_Curr}(f)\right) \quad (2)$$

where Spec_Curr is the current dB compressed spectrum and Spec_Curr_n is the current dB compressed spectrum after overall level normalization across frequency sub-band.sf. Normalization according to equation (2) will ensure that adaptation of the average speech spectral shape will not be biased by the overall amplitude of the speech signal. Other level normalization techniques such as weighted averaging, frequency-dependent averaging, SNR-dependent averaging or other normalization techniques may also be used.

The average speech spectral shape may be adapted according to a leaky-integrator algorithm, a first order IIR filter, or some other adaptive filtering or weighted averaging algorithm. An equation for updating the average speech spectral shape estimate according to an embodiment of the invention is:

Spec_Avg(*f*)=(Spec_Avg(*f*)*(Adapt_Rate−1)+Spec_Curr_*n*(*f*)/Adapt_Rate  (3)

where

Adapt_Rate=AdaptTimeConstant/SecPerBuffer  (4)

SecPerBuffer=(FFT Size−BufferOverlap)/Sample Rate  (5)

Spec_Avg is the average speech spectral shape estimate. Adapt_Rate is a parameter that controls the speed of adaptation. Adapt_Rate must be >1. An appropriate value for AdaptTimeConstant may be between approximately 2 and 6 seconds.

The average speech spectral shape estimate provides an estimate of the spectral shape of speech input to the system over time. The manner in which the average speech spectral shape estimate is generated takes into account slowly changing or time invariant acoustical characteristics of the environment, the frequency response of the microphone, the position of the microphone relative to the person speaking, and other factors that will influence the frequency response of the system.

Given the average speech spectral shape estimate, it is possible to determine a correction factor for each frequency sub-band that may be added to the average speech spectral shape estimate in order to normalize the average speech spectral shape estimate to a desired target spectral shape. These same correction factors may then be applied to the individual spectra of each successive windowed buffer to enhance the input speech signal. The correction factors may be applied directly to the compressed dB spectra of each windowed buffer (e.g. spectrum 156 from FIG. 5), or they may be extrapolated and applied to the non-compressed dB spectra of the windowed buffers (e.g. spectrum 144 from FIG. 4).

Figure 7:
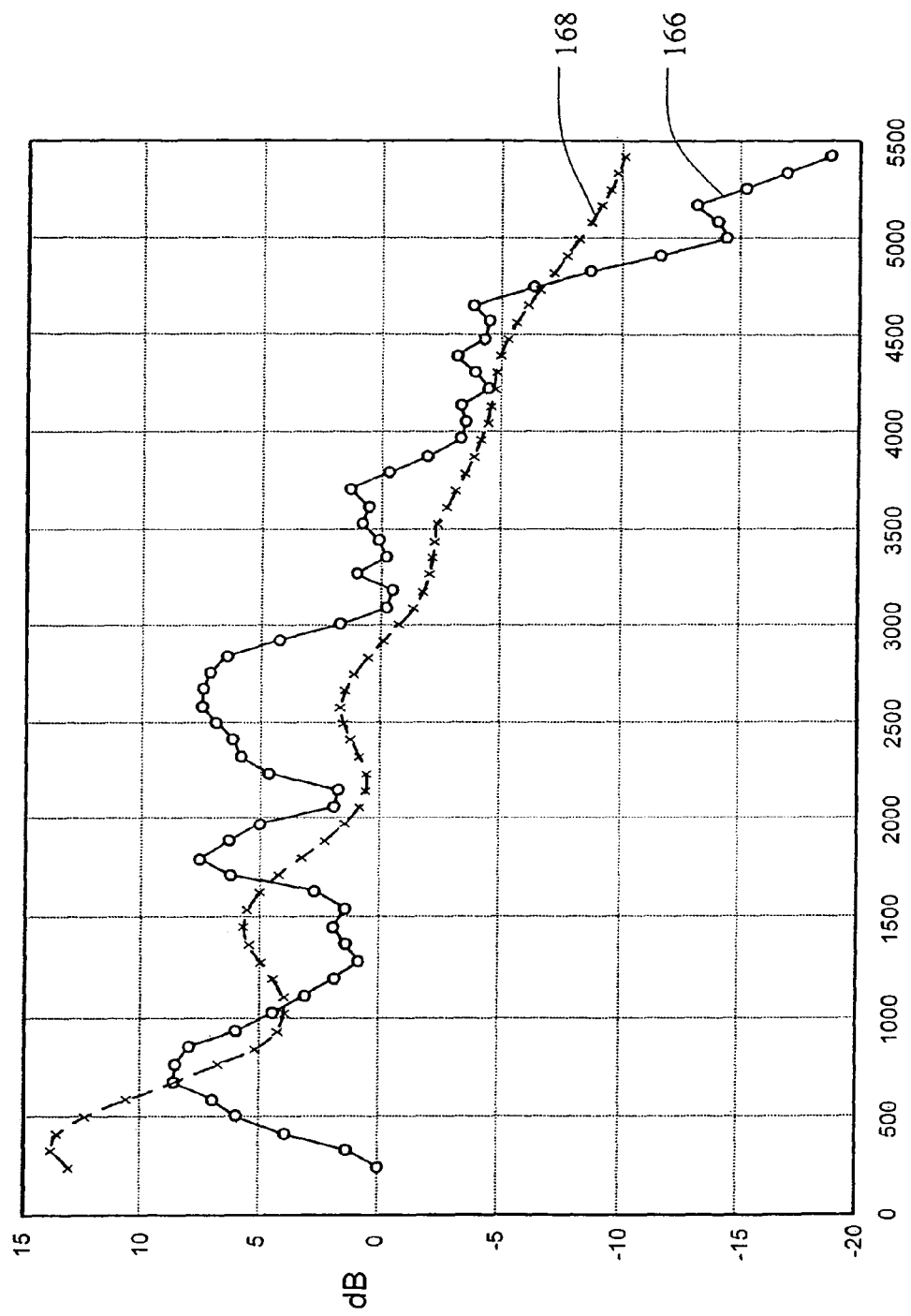
FIG. 7 is a dB v. frequency plot of an average speech spectral shape estimate and a target spectral shape.

An average speech spectral shape estimate 166 is shown in FIG. 7. A target spectral shape 168 is also shown. The target spectral shape may correspond to the optimum frequency response of a hands-free telephone system in an automobile, or the target spectral shape may represent the optimum speech frequency response for providing highly intelligible speech signals to a speech recognition system, or some other application. In any case, the target spectral shape represents the optimum frequency response toward which the dB spectrum 166 of the actual input signal is to be adjusted. A spectral correction factor for every sub-band of the average speech spectral shape estimate 166 may be calculated by subtracting the target spectral shape 168 from the average speech spectral shape estimate 166. This difference represents the amount that must be added to or subtracted from the average speech spectral shape estimate 166 in order for the shape of the average speech spectral shape estimate 166 to exactly match the target speech spectral shape 168. The calculation for determining the spectral correction factor may be expressed as:

Spec_Corr(*f*)=Spec_Target(*f*)−Spec_Avg(*f*)  (6)

where

Spec_Target is the target speech spectral shape
Spec_Corr is the dB spectral correction factor Also, the overall level of the spectral correction values may be normalized according to:

$$\text{Spec\_Corr}(f) = \text{Spec\_Corr}(f) - \frac{1}{N}\left(\sum_{f}^{N} \text{Spec\_Corr}(f)\right) \quad (7)$$

This will allow for correction of the speech spectral shape without significantly modifying the overall amplitude or loudness of the speech signal. Other normalizing techniques, such as weighted averaging or frequency-dependent averaging, or other techniques may be used.

Further, the spectral correction values may be limited to improve the robustness of the algorithm and to ensure that enhancing the speech signal does not produce unexpected results or modify the speech signal too drastically. A maximum correction factor may be established as:

Spec_Corr(*f*)=Max(Spec_Corr(*f*), −Core_dB_Limit)  (8)

Spec_Corr(*f*)=Min(Spec_Corr(*f*), Corr_dB_Limit)  (9)

Typical values for Corr_dB_Limit may be in the range between 5 and 15 dB.

Figure 8:
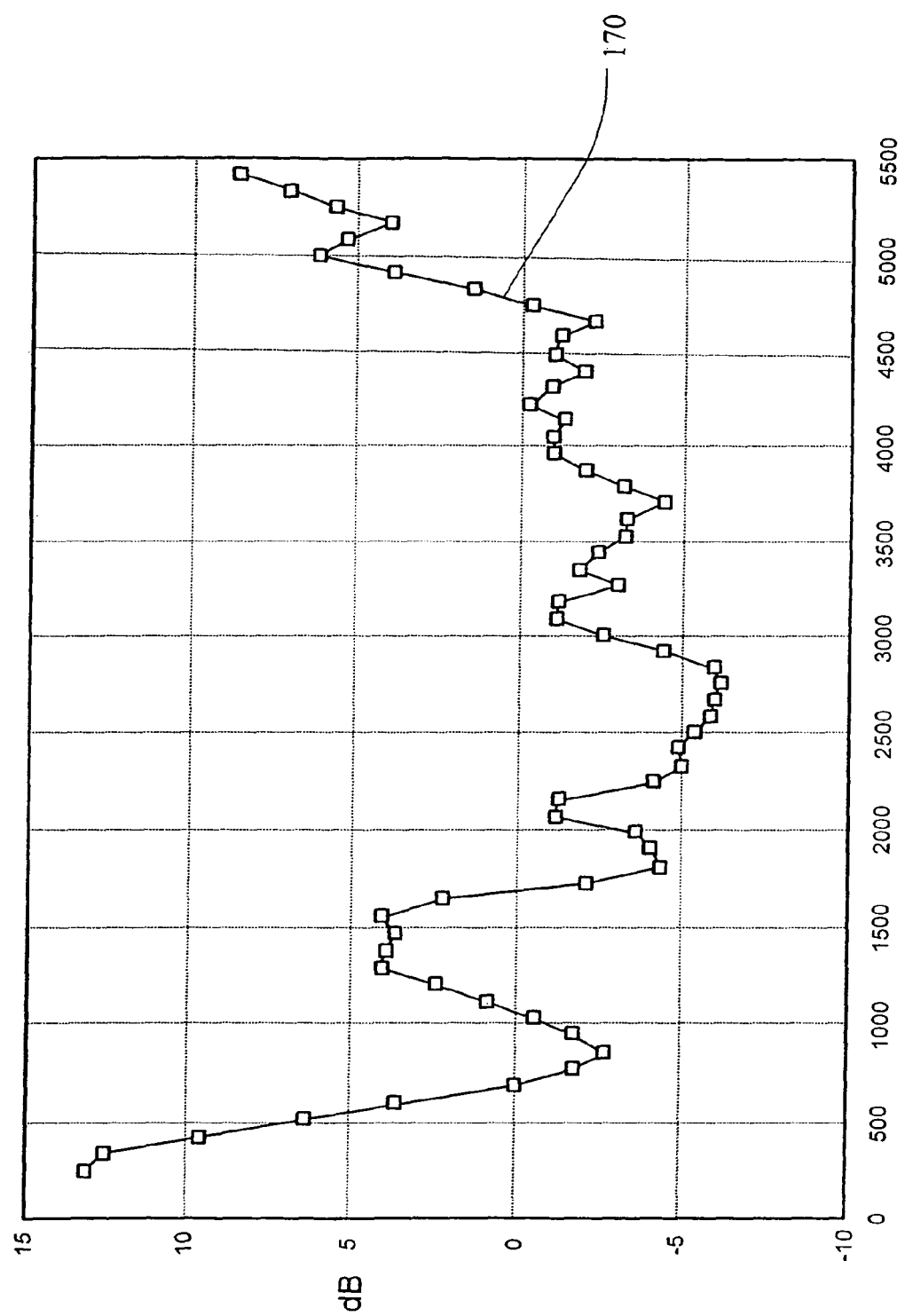
FIG. 8 is a dB v. frequency plot of a spectral correction factor derived by subtracting the average speech spectral shape estimate of FIG. 7 from the target spectral shape also shown in FIG. 7.
Figure 9:
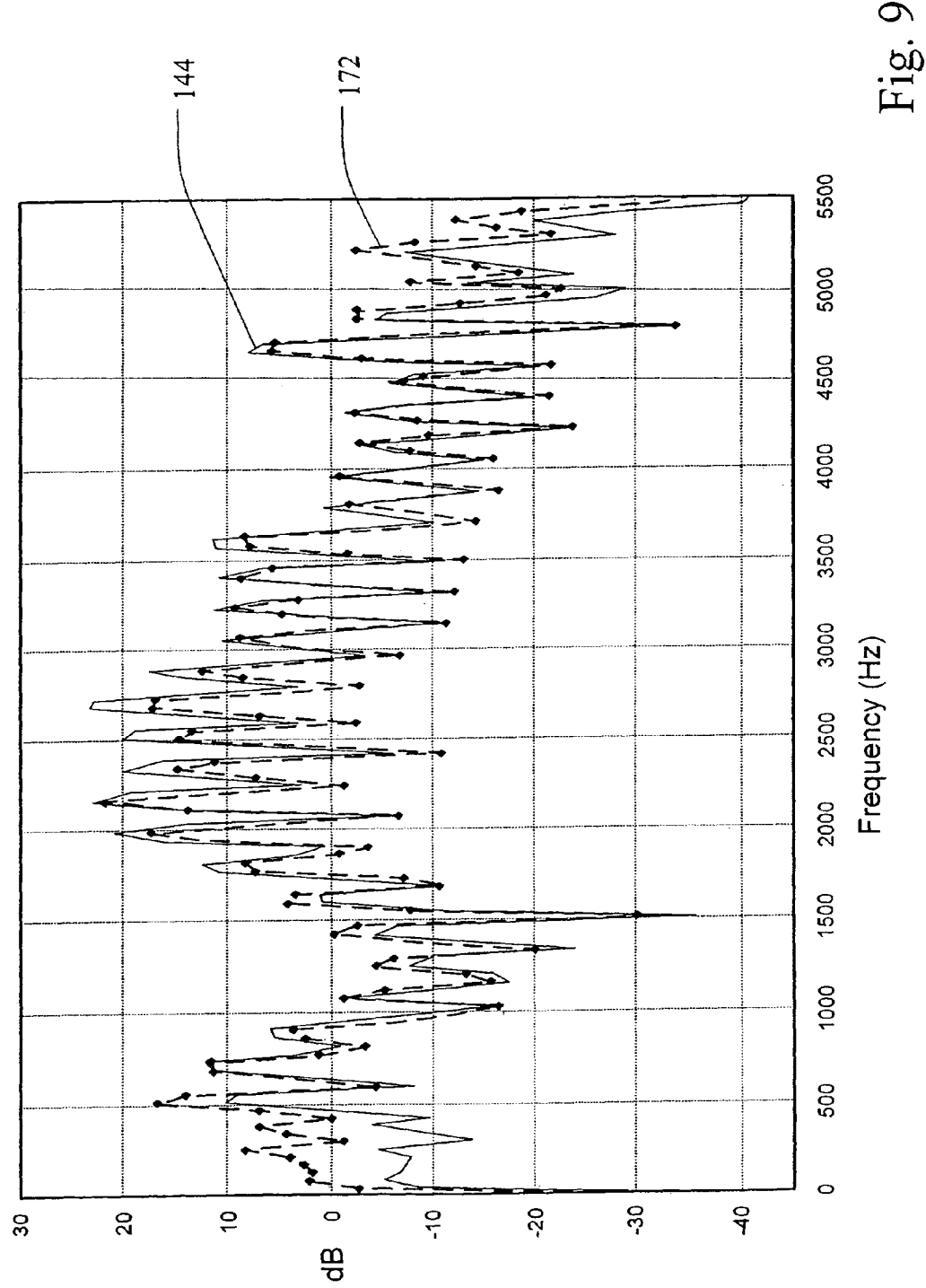
FIG. 9 is a dB v. frequency plot showing both the original spectrum of the speech signal (i.e. from FIG. 4) corresponding to one of the windowed buffers, and the enhanced or normalized spectrum of the speech signal.

FIG. 8 shows the correction factor 170 calculated by subtracting the average speech spectral shape 166 from the target spectral shape 168, as shown in equation 6, and level normalization according to equation 7. The present invention assumes that the actual spectrum of the input speech signal corresponding to an individual buffered window will require correction similar to that required to adjust the average speech spectral shape estimate. Accordingly, the correction factor 170 may by applied to the spectra of each successive windowed buffer of the input speech signal. The correction factor values determined above are determined for each frequency sub-band of the compressed average speech spectral shape estimate spectrum. Before being applied to the spectrum corresponding to the current windowed buffer, i.e. the spectrum corresponding to windowed buffer 134, the correction values may be extrapolated to estimate correction values for all of the frequency bins of the uncompressed FFT dB spectrum. This may be performed using simple linear interpolation or cubic spline interpolation, or some other algorithm. The spectrum of the corresponding windowed buffer 134 may then be corrected by adding the expanded correction values (in units of dB) to the uncompressed spectrum of the input signal corresponding to the windowed buffer 134. The corrected spectrum 172 corresponding to windowed buffer 134 is shown in FIG. 9 along with the original spectrum 144.

Once the spectrum of a windowed buffer has been corrected it may be transformed back into the time domain. This requires converting the corrected dB spectrum 176 into an amplitude spectrum, and transforming the amplitude spectrum back to the time domain by performing a 256 point inverse FFT, or other inverse transform from the frequency domain back into the time domain. The time domain signal that results from the inverse FFT or other transform constitutes an enhanced speech signal corresponding to the windowed buffer 134. The enhanced speech signal will have an average spectral shape that more closely resembles the target spectral shape. Enhanced speech signals are re-synthesized for each windowed buffer, and are overlapped and added together in the time domain. The result is a re-synthesized time domain speech signal that substantially maintains a desired spectral shape over time, taking into account slowly changing characteristics of the system's transfer function. The result is an enhanced voice signal that better serves the particular application for which it is intended, be it a speech recognition system, a hands free telephone system, or some other application.

FIGS. 10 and 11 show spectrogram plots which illustrate the adaptive qualities of the method just described. Both figures display plots of frequency (vertical axes) v. time (horizontal axis) v. dB (gray scale). The plot 180 in FIG. 10 represents the original speech signal without correction. The plot 182 in FIG. 11 shows the adaptation of the average speech spectral shape estimate over time, using the present method. Note, for approximately the first two seconds of the input signal there is no discernible spectral pattern visible in FIG. 11. However, as time goes on and significant speech energy occurs (i.e. FIG. 10, after Time=2 s), a pattern begins to emerge in FIG. 11. Significant spectral energies begin to appear between approximately 500 z-1,000 Hz, 1,800 Hz-2,000 Hz, and between 2300 Hz-3,000 Hz. Lower average spectral energies are found below 500 Hz, between 1,000 Hz in the 1800's, and above 3,000 Hz. The gradual appearance of these spectral characteristics in FIG. 11 indicate how the average speech spectral shape estimate adapts over time to the slowly varying or time invariant spectral characteristics of the input speech signal.

In some cases it may be more desirable to shape the background noise frequency response rather than the speech signal frequency response. For example, in high SNR situations background noise is not a significant problem and enhancing the speech signal spectral shape is most appropriate. In low SNR situations, however, it may be more desirable to target the background noise spectral shape. For example, background noise having tonal qualities has been found to be more annoying to listeners than broadband noise. Thus, in some cases it may be beneficial to smooth the background noise spectrum to eliminate peeks at specific frequencies which may otherwise prove to be an irritant to the listener.

Figure 12:
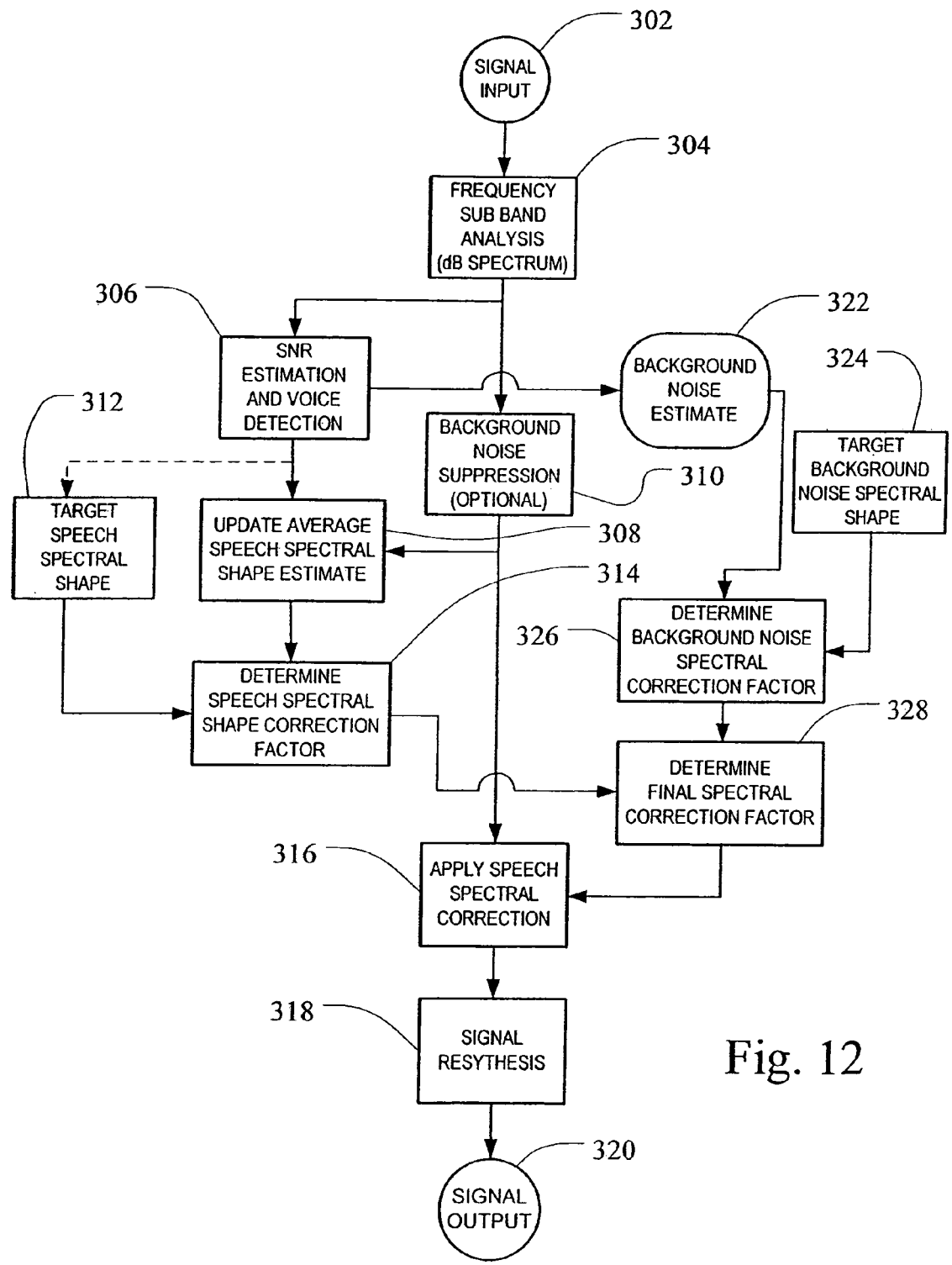
FIG. 12 is a flowchart illustrating an alternative embodiment of a method of enhancing the frequency response of a speech signal.

Accordingly, in another embodiment, the quality and intelligibility of a speech signal is enhanced by targeting and shaping the background noise spectrum of the received speech signal as opposed to enhancing the spectrum of the speech components themselves. A flow chart 300 embodying this alternative is shown in FIG. 12. The flow chart 300 in FIG. 12 has many similarities to the flow chart 100 shown in FIG. 2. In fact, the method for adaptively enhancing the frequency response of the speech signal embodied in the flow chart 100 is substantially repeated in flow chart 300. The receive input signal 102, frequency sub-band. analysis 104, SNR estimation and voice detection 106, update average speech spectral shape estimate 108, target speech spectral shape 112, and determine speech spectral shape correction factor 114 in flowchart 100 of FIG. 2 all find their exact corollary in the receive input signal 302, frequency sub-band. analysis 304, SNR estimation and voice detection 306, update average speech spectral shape estimate 308, background noise suppression 310, target speech spectral shape 312, and determined speech spectral shape correction factor 314 of FIG. 12, respectively. The apply speech spectral shape correction factor 116 and signal re-synthesis 118 of FIG. 2 likewise have parallels in FIG. 12, namely apply spectral correction factor 316 and signal re-synthesis 318. However, as will be described in more detail below, although the apply spectral shape correction factor of 316 and signal re-synthesis 318 functions perform substantially the same functions as their counterparts in the earlier embodiment, they perform these functions on somewhat different input.

Since the input signal 302; frequency sub-band. analysis 304, SNR estimation and voice detection 306, update average speech spectral shape estimate 308, background noise suppression 310, target speech spectral shape 312; and determine speech spectral shape correction factor 314 functions all operate in substantially the same manner as described above with regard to FIG. 2, further description of these functions is omitted here. It is sufficient to note that the output of the determine speech spectral shape correction factor 314 is a speech spectral shape correction factor that may be added to the spectrum of the input signal 302 to correct or normalize the spectral shape of the input signal 302 much like the output of the corresponding determine speech spectral shape correction factor function 114 of flowchart 100. However, whereas in the method embodied in flow chart 100 the speech spectral shape correction factor is applied directly to the spectrum of the input signal (optionally after background noise suppression has been applied to the input speech signal spectrum), in the method embodied in flowchart 300 in FIG. 14 the speech spectral shape correction factor determined at 314 is input to determine final spectral correction factor 326. Determine final spectral correction factor 326 also receives input from determine background noise spectral shape correction factor 326. Thus, according to this embodiment, a final spectral correction factor is determined based on both a speech spectral shape correction factor and a background noise spectral shape correction factor.

Since determination of the speech spectral shape correction factor has already been described with regard to flow chart 100 in FIG. 2, it remains only to describe the determination of the background noise spectral shape correction factor. As has been described, an input speech signal is received at 302. The input speech signal may include background noise. The input speech signal is subjected to a frequency sub-band. analysis at 304. The result of the frequency sub-band. analysis is a compressed dB scale spectrum representing the input speech signal. The compressed dB speech signal spectrum is input to SNR estimation and voice detection 306. SNR estimation and voice detection 306 produces a background noise estimate 322 which is input to determine background noise spectral shape correction factor 326. The background noise estimate 322 provides an estimate in dB of the background noise across each frequency bin of the compressed dB spectrum of the input speech signal 302. The background noise estimate 312 may include unwanted peaks or other characteristics at various frequencies which are detrimental to the speech signal sound quality and intelligibility. Therefore, it is desirable to smooth the background noise estimate or otherwise shape the background noise estimate to conform to a desired target background noise spectral shape 324. The target background noise spectral shape is input to determine background noise spectral shape correction factor 326.

The difference between background noise estimate 322 and the target background noise spectral shape represents the amount by which the background noise estimate must be adjusted in order to conform to the shape of the target background noise spectral shape. Like the determined speech spectral shape correction factor 314, the determine background noise spectral correction factor 326 calculates a background noise spectral correction factor by subtracting the target speech spectral shape from the background noise estimate across all frequency bins of the compressed dB spectrum of the input signal. Also like the speech spectral shape correction factor, the background noise spectral shape correction factor may be added directly to the compressed dB spectrum of the input speech signal 302 in order to shape the frequency spectrum of the background noise included in the input speech signal 302. However, in the embodiment depicted in the flow chart 300, both the speech spectral shape correction factor and the background noise spectral shape correction factor contribute to a final spectral shape correction factor. The final spectral shape correction factor is then added to the compressed db spectrum of the input speech signal 302.

The output of the determine speech spectral shape correction factor 314 and the output from the determine background noise spectral shape correction factor 328 are both input to the determine final spectral shape correction factor 328. According to an embodiment, the speech spectral shape correction factor and the background noise spectral shape correction factor contribute to the final spectral shape correction factor in an inversely proportional manner according to the formula:

$$\text{Final\_corr}(f) = a*\text{Speech\_Corr}(f) + (1-a)*\text{Noise\_Corr}(f) \quad (10)$$

where
Speech_Corr(f)=Speech Spectral Shape Correction Factor
Noise_Corr(f)=Background Noise Spectral Shape Correction Factor
Final_corr(f)=Final Spectral Shape Correction Factor
a=SNR Dependend Mixing Factor; 0<a<1
If the long term SNR is high a→1
If the long term SNR is low a→0

Thus, in high SNR conditions the speech spectral shape correction factor (Speech_Corr(f)) predominates, and in low SNR conditions the background noise spectral shape correction factor (Noise_Corr (f)) predominates. Once the final spectral shape correction factor has been determined, it is applied to the spectrum of the input speech signal at 316. As with the embodiment shown in FIG. 2, the final spectral shape correction factor is added to the dB spectrum of the received speech signal output from the frequency sub-band. analysis 304. The final corrected or enhanced spectrum is then re-sysnthesized at 318. The re-synthesis process is substantially the same as that described above with regard to the embodiment depicted in FIG. 2. The final enhanced signal is output at 320.

Figure 13:
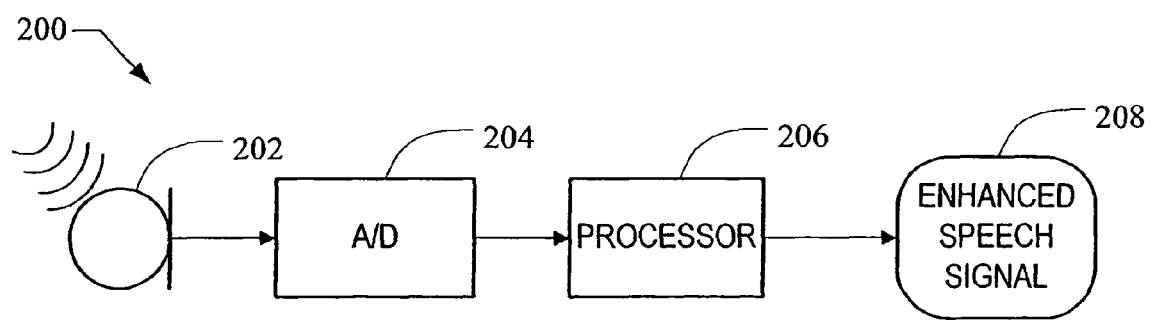
FIG. 13 is a block diagram of a system for enhancing the frequency response of the speech signal according to the invention

In addition to the method for providing an enhanced speech signal described above, the invention further relates to a system for carrying out such a speech signal enhancement method. FIG. 13 shows a block diagram of such a system 200. The system includes a microphone 202 an A/D converter 204 and a signal processor 206. The microphone 202 captures an input signal. The A/D converter samples the analog signal from the microphone and provides a digital signal representing the speech and background noise received by the microphone to the signal processor 206. The processor 206 includes instructions for performing all of the steps described above on the input sign a captured by microphone 202. Thus, the processor performs frequency sub-band analysis, SNR estimation and voice detection on the input signal. The processor creates and updates an average speech spectral shape estimate for every windowed buffer of the input speech signal, and stores a target speech spectral shape. For each windowed buffer the processor calculates a spectral correction factor for matching the average speech spectral shape estimate to the target speech spectral shape. The processor may also determine a background noise spectral shape correction factor based on a background noise estimate and a stored target background noise spectral shape. The processor may apply either the speech spectral shape correction factor or the background noise spectral correction factor to the spectra of each windowed buffer or the processor may apply a final correction factor comprising a composite of the speech spectral shape correction factor and the background noise spectral shape correction factor. The processor then converts the spectra back into the time domain, and re-synthesizes an enhanced output signal 208. The output signal 208 may then in turn be applied as an input to another system that employs the enhanced speech signal.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A computer-implemented method of enhancing a frequency response of a received speech signal, the method comprising:
performing, through the use of a processor, a frequency sub-band analysis on successive overlapping windowed buffers of the received speech signal to generate a compressed dB spectrum of the received speech signal for each successive overlapping windowed buffer;
adapting a running average of a spectral shape of speech based on a current compressed dB spectrum corresponding to one of the successive overlapping windowed buffers;
subtracting, through the use of the processor, the adapted running average of the spectral shape of speech from a target spectral shape, the difference between the target spectral shape and the adapted running average of the spectral shape of speech comprising a spectral shape correction factor; and adding, through the use of the processor, the spectral shape correction factor to the current compressed dB spectrum.

2. The method of claim 1 where the successive overlapping windowed buffers comprise Hanning windows.

3. The method of claim 1 further comprising adapting a background noise estimate for each successive overlapping windowed buffer.

4. The method of claim 3 further comprising:
determining whether signal power for each frequency sub-band of the compressed dB spectrum of each successive overlapping windowed buffer exceeds the background noise estimate by a threshold amount;
determining whether each sub-band of the compressed dB spectrum of each successive overlapping windowed buffer likely contains speech; and
adapting the running average of the spectral shape of speech for each frequency sub-band in which the signal power exceeds the background noise by at least the threshold amount and which likely contain speech.

5. The method of claim 1 where the running average of the spectral shape of speech is calculated using a first order IIR filter.

6. The method of claim 1 of further comprising re-synthesizing a speech signal from the corrected spectra corresponding to each successive overlapping windowed buffer.

7. The method of claim 1 where the target spectral shape corresponds to an ideal spectral shape of a speech signal input to a telephone system.

8. The method of cleaning 1 where the target spectral shape corresponds to an ideal spectral shape of a speech signal input to a voice recognition system.

9. The method of claim 4 where the threshold amount varies from one frequency sub-band to the next depending on the expected noise characteristics of the system.

10. A system for enhancing the frequency response of a speech signal comprising:
a microphone for capturing a speech signal;
an A/D converter for converting the speech signal into a digital speech signal; and
a processor adapted to continuously update a running average of a spectral shape of the speech signal received at the microphone, to subtract the continuously updated running average of the spectral shape of the speech signal from a target spectral shape, the difference between the target spectral shape and the adapted running average of the spectral shape of speech comprising a speech spectral shape correction factor, and to adjust the speech signal using the speech spectral shape correction factor.

11. The system of claim 10 further comprising an application configured to utilize the speech signal having a spectrum adjusted by the processor based on differences between the continuously updated average spectral shape of the speech signal and the target spectral shape.

12. The system of claim 11 where the application is a hands free telephone system.

13. The system of claim 11 where the application is a speech recognition system.

14. A computer-implemented method of enhancing a frequency response of a speech signal comprising:
performing, through the use of a processor, a frequency sub-band analysis on successive overlapping windowed buffers of the speech signal to generate a compressed dB spectrum of the received speech signal for each successive overlapped windowed buffer;
generating, through the use of the processor, a background noise estimate across the frequency sub-bands;
generating, through the use of the processor, a background noise spectral shape correction factor by subtracting the background noise estimate from a target background noise spectral shape; and
adding, through the use of the processor, the background noise spectral shape correction factor to a spectrum corresponding to one of the successive overlapping windowed buffers.

15. The method of claim 14 where the successive overlapping windowed buffers comprise Hanning windows.

16. The method of claim 14 further comprising re-synthesizing a speech signal from the corrected spectra corresponding to each successive overlapping windowed buffer.

17. The method of claim 14 where the target background noise spectral shape corresponds to smooth broad band background noise.

18. A computer-implemented method of enhancing a frequency response of a speech signal comprising:
performing, through the use of a processor, a frequency sub-band analysis on successive overlapping windowed buffers of said speech signal to generate a compressed dB spectrum of the received speech signal for each successive overlapped windowed buffer;
adapting a running average of a spectral shape of speech based on a current compressed dB spectrum corresponding to one of the successive overlapping windowed buffers;
subtracting, through the use of the processor, the adapted running average of the spectral shape of speech from a target spectral shape, the difference between the target spectral shape and the adapted running average of the spectral shape of speech comprising a spectral shape correction factor;
generating, through the use of the processor, a background noise estimate across the frequency sub-bands;
calculating, through the use of the processor, a background noise spectral shape correction factor corresponding to a difference between the background noise estimate and a target background noise spectral shape;
calculating, through the use of the processor, an overall spectral shape correction factor based on the speech spectral shape correction factor and the background noise spectral shape correction factor; and
adding, through the use of the processor, the overall spectral shape correction factor to a spectrum corresponding to one of the successive overlapping windowed buffers,
where the step of calculating, through the use of the processor, an overall spectral correction factor comprises inversely weighting the speech spectral shape correction factor and the background noise spectral shape correction factor according to a long term SNR estimate.

* * * * *